Aug. 4, 1936.   A. SONNEFELD   2,050,024
MICROSCOPE OBJECTIVE
Filed July 9, 1935

Inventor:

Patented Aug. 4, 1936

2,050,024

UNITED STATES PATENT OFFICE 2,050,024

MICROSCOPE OBJECTIVE

August Sonnefeld, Jena, Germany, assignor to the firm Carl Zeiss, Jena, Germany

Application July 9, 1935, Serial No. 30,496
In Germany August 3, 1934

3 Claims. (Cl. 88—57)

Application has been filed in Germany, August 3, 1934.

The microscope objectives in use so far produce an image which is curved strongly, and this especially when large apertures and great magnifications are concerned, it being impossible to compensate this curvature by means of the usual eye-pieces. This disadvantage has been put up with, and microscopists are compelled to content themselves with the astigmatism being made to lie within tolerable limits as far as it possibly can. In subjective examination, the curvature of the image makes itself felt by preventing the microscopist from seeing really sharply any more than only a small portion of the field of view at a time. When desiring to search all parts of a preparation, the microscopist is therefore compelled to continuously vary the focusing adjustment. It is generally believed that an improvement of the microscope objectives is hardly worth while when small apertures and low magnifications are concerned, since errors are but small in this case, and that stronger systems can be improved only by considerably increasing the number of lenses. Stronger systems are feared also to produce too much astigmatism, and microscopists therefore expect only very little profit from a flattening of the field of view in such systems.

According to the invention, which aims at considerably improving the flattening of the image, the microscope objective consists of two groups of lenses, namely a front and a rear group, whose errors compensate each other. The front group is convergent and so constructed that the Petzval sum $$\left(\sum \frac{\varphi}{n}\right.$$

in which $\varphi$ and $n$ symbolize the refractive power and the refractive index, respectively, of each of the lenses constituting the said group) of the virtual image of an object at the working distance is positive. The rear group is also convergent and has a negative Petzval sum. This rear group has a divergent member and two convergent members, one convergent member being disposed at either side of this divergent member and the convergent members having air spaces between them and the divergent member. Each of the said two groups is corrected per se, which, excepting small residual errors, can be readily effected by the means known in optics so far, it being thus possible to obtain a substantial reciprocal compensation of the errors of the two members.

It is convenient to have the front group effect ⅓ to ⅛ of the total magnification of the objective.

Figure 1:
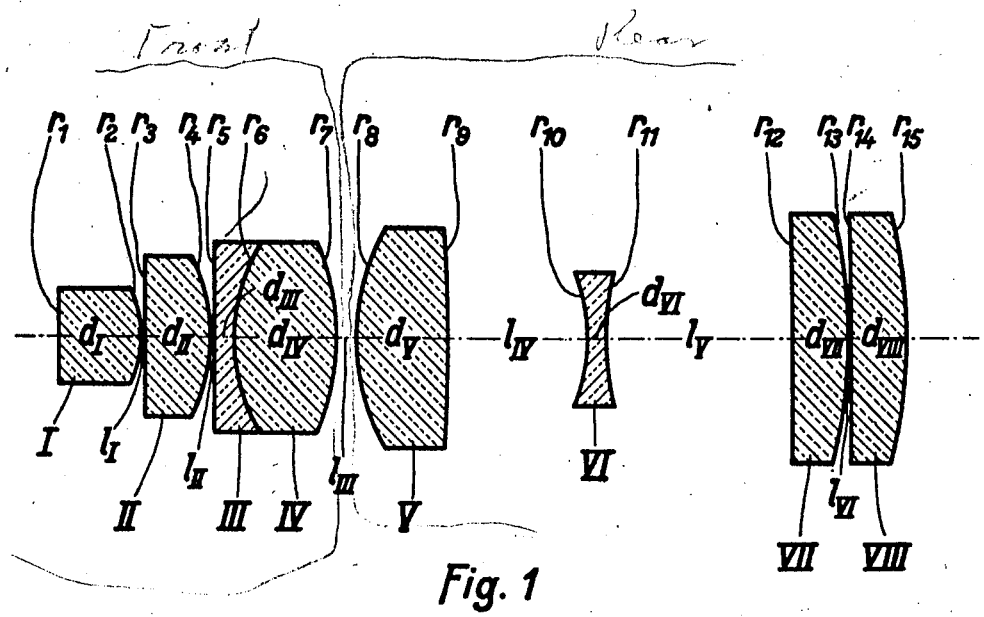
Figure 2:
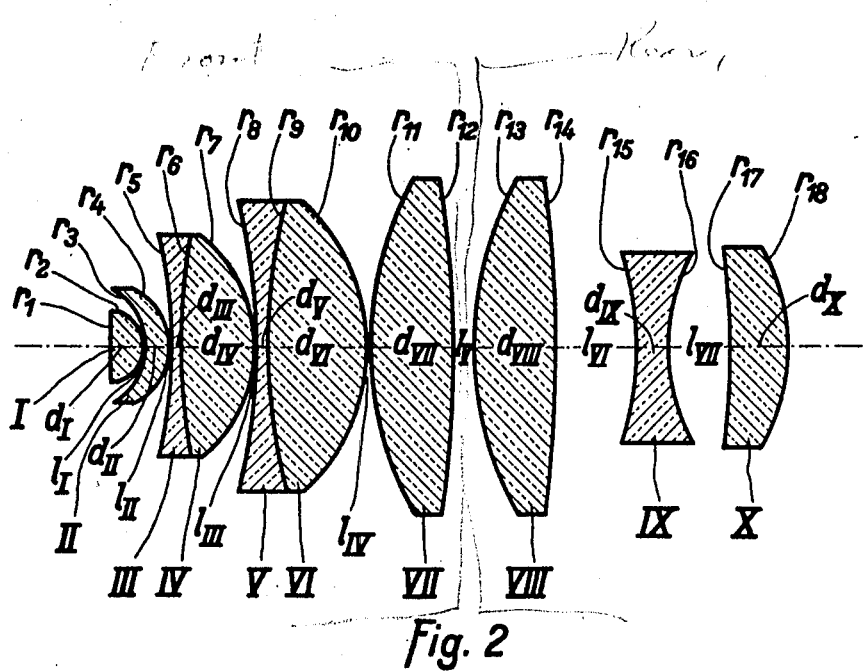

The accompanying drawing comprising Figures 1 and 2 represents two examples of the invention on an enlarged scale and in section.

The example according to Figure 1 is an achromatic objective having a focal length of 5.00 millimetres. The decisive values are indicated in the following table (linear measures in millimetres).

Table 1

| | | | |
|---|---|---|---|
| $r_1 =$ | $\infty$ | $d_I$ | $=2.0$ |
| $r_2 =$ | $-2.513$ | $l_I$ | $=0.1$ |
| $r_3 =$ | $\infty$ | $d_{II}$ | $=1.6$ |
| $r_4 =$ | $-4.196$ | $l_{II}$ | $=0.1$ |
| $r_5 =$ | $\infty$ | $d_{III}$ | $=0.5$ |
| $r_6 =$ | $+4.196$ | $d_{IV}$ | $=2.5$ |
| $r_7 =$ | $-5.797$ | $l_{III}$ | $=0.5$ |
| $r_8 =$ | $+5.104$ | $d_V$ | $=2.2$ |
| $r_9 =$ | $-39.340$ | $l_{IV}$ | $=3.4$ |
| $r_{10} =$ | $-4.010$ | $d_{VI}$ | $=0.5$ |
| $r_{11} =$ | $+6.619$ | $l_V$ | $=4.5$ |
| $r_{12} =$ | $-489$ | $d_{VII}$ | $=1.4$ |
| $r_{13} =$ | $-11.700$ | $l_{VI}$ | $=0.0$ |
| $r_{14} =$ | $-489$ | $d_{VIII}$ | $=1.4$ |
| $r_{15} =$ | $-11.700$ | | |

| | $n_D$ | $\nu$ |
|---|---|---|
| I, II, IV, V, VII, VIII | 1.52 | 64 |
| III, VI | 1.74 | 28 |

The front group consists of the lenses I to IV, and the rear group consists of the lenses V to VIII. In the rear group, the lenses V to VII constitute the members referred to hereinbefore.

The example represented by Figure 2 is an achromatic immersion objective having a focal length of 2.055 millimetres. The decisive values are indicated in the following table (linear measures in millimetres).

Table 2

| | | | |
|---|---|---|---|
| $r_1 =$ | $\infty$ | $d_I$ | $=0.8$ |
| $r_2 =$ | $-0.894$ | $l_I$ | $=0.02$ |
| $r_3 =$ | $-1.560$ | $d_{II}$ | $=0.6$ |
| $r_4 =$ | $-1.505$ | $l_{II}$ | $=0.05$ |
| $r_5 =$ | $-11.300$ | $d_{III}$ | $=0.3$ |
| $r_6 =$ | $+20.600$ | $d_{IV}$ | $=1.8$ |
| $r_7 =$ | $-3.305$ | $l_{III}$ | $=0.05$ |
| $r_8 =$ | $-14.010$ | $d_V$ | $=0.3$ |
| $r_9 =$ | $+15.510$ | $d_{VI}$ | $=2.4$ |
| $r_{10} =$ | $-4.714$ | $l_{IV}$ | $=0.1$ |
| $r_{11} =$ | $+8.200$ | $d_{VII}$ | $=2.0$ |
| $r_{12} =$ | $-26.530$ | $l_V$ | $=0.5$ |
| $r_{13} =$ | $+8.017$ | $d_{VIII}$ | $=2.0$ |
| $r_{14} =$ | $-32.320$ | $l_{VI}$ | $=2.0$ |
| $r_{15} =$ | $-7.292$ | $d_{IX}$ | $=0.8$ |
| $r_{16} =$ | $+4.646$ | $l_{VII}$ | $=1.5$ |
| $r_{17} =$ | $-17.700$ | $d_X$ | $=1.4$ |
| $r_{18} =$ | $-4.714$ | | |

| | $n_D$ | $\nu$ |
|---|---|---|
| I | 1.46 | 66 |
| II | 1.52 | 64 |
| III, V | 1.61 | 37 |
| IV, VI, VII, VIII | 1.49 | 70 |
| IX | 1.81 | 25 |
| X | 1.53 | 55 |

The front group consists of the lenses I to VII, and the rear group consists of the lenses VIII to X.

The two examples obviously provide a very substantial flattening of the image as compared to the corresponding systems known so far, this improvement outweighing considerably the slight increase of astigmatism it entails. The examples prove that the used optical means are not extraordinary at all, and the number of lenses (especially in the system according to Figure 2, which is more powerful) has not been increased so much as to make any person skilled in the art urge against the attained advantage by alleging that this advantage is obtained at the price of the use of too many lenses.

I claim:

1. A microscope objective consisting of a front converging group adapted to produce a virtual image of an object at the working distance and having a positive Petzval sum, and a rear convergent group having a divergent member and two convergent members, these two convergent members being disposed at either side of the said divergent member and having air spaces between them and the divergent member, and the rear group having a negative Petzval sum.

2. A microscope objective consisting of a front converging group adapted to produce a virtual image of an object at the working distance and having a positive Petzval sum, and a rear convergent group consisting of a divergent member, a convergent member disposed before this divergent member, and two convergent members lying behind this divergent member, these four members being separated from each other by spaces of air, and the rear group having a negative Petzval sum.

3. In a microscope according to claim 1, the front group being adapted to so magnify the image it produces that this magnification is ⅓ to ⅛ of the total magnification effected by the objective.

AUGUST SONNEFELD.